United States Patent
Mizutani et al.

(10) Patent No.: US 9,758,176 B2
(45) Date of Patent: Sep. 12, 2017

(54) VEHICLE CONTROL APPARATUS

(71) Applicant: Fuji Jukogyo Kabushiki Kaisha, Tokyo (JP)

(72) Inventors: Koichi Mizutani, Tokyo (JP); Hideaki Endo, Tokyo (JP); Naoya Kidokoro, Tokyo (JP); Hiroshi Numagami, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 116 days.

(21) Appl. No.: 14/573,019

(22) Filed: Dec. 17, 2014

(65) Prior Publication Data

US 2015/0166058 A1    Jun. 18, 2015

(30) Foreign Application Priority Data

Dec. 18, 2013  (JP) .................................. 2013-261064

(51) Int. Cl.

| | |
|---|---|
| E05F 15/00 | (2015.01) |
| G08G 1/16 | (2006.01) |
| B60K 35/00 | (2006.01) |
| B60W 30/08 | (2012.01) |
| B60W 50/08 | (2012.01) |
| B60W 50/12 | (2012.01) |
| B60W 50/14 | (2012.01) |
| B60W 40/02 | (2006.01) |

(52) U.S. Cl.
CPC ............ *B60W 50/14* (2013.01); *B60W 30/08* (2013.01); *B60W 40/02* (2013.01)

(58) Field of Classification Search
CPC ...... B60W 30/00; B60W 30/08; B60W 50/14; B60W 40/02
See application file for complete search history.

(56) References Cited

U.S. PATENT DOCUMENTS

| | | | |
|---|---|---|---|
| 7,831,350 B2 | 11/2010 | Goudy | |
| 2004/0181334 A1 | 9/2004 | Blumbergs et al. | |
| 2006/0142917 A1* | 6/2006 | Goudy .................. | B60K 35/00 |
| | | | 701/45 |
| 2008/0255725 A1 | 10/2008 | Geisler et al. | |
| 2011/0224897 A1 | 9/2011 | Tan | |
| 2013/0030657 A1* | 1/2013 | Chatterjee ............. | B60W 50/08 |
| | | | 701/46 |
| 2014/0115507 A1 | 4/2014 | Bailey et al. | |

FOREIGN PATENT DOCUMENTS

| | | | |
|---|---|---|---|
| JP | 8184449 A | * | 7/1996 |
| JP | H08-184449 | | 7/1996 |

* cited by examiner

*Primary Examiner* — Adam Tissot
(74) *Attorney, Agent, or Firm* — Troutman Sanders LLP (57) ABSTRACT

When the speed of a vehicle is not lower than a prescribed value, an operation disabling signal is output from an operation disabling controller to a car navigation system, and the operation of the car navigation system is disabled. However, even when the operation disabling signal is being output to the car navigation system, in the cases where assistance control for a driving operation is being performed on the basis of a risk determination result, and where a prediction result of the risk to the vehicle is that the risk to the vehicle does not increase before a prescribed time elapses, then an operation enabling signal is output from the operation enabling controller to the car navigation system, whereby it becomes possible to operate the car navigation system.

9 Claims, 8 Drawing Sheets

VEHICLE CONTROL APPARATUS

CROSS-REFERENCE TO RELATED APPLICATIONS

The present application claims priority from Japanese Patent Application No. 2013-261064 filed on Dec. 18, 2013, the entire contents of which are hereby incorporated by reference.

BACKGROUND

1. Technical Field

The present invention relates to a vehicle control apparatus for safety improvement while a vehicle is traveling.

2. Related Art

Nowadays, vehicles often provide functions aimed at operations other than driving. For instance, various kinds of vehicle-mounted equipment, such as a car navigation system and an audio device, is installed at the driver seat of a vehicle. In order to operate the vehicle-mounted equipment while traveling, the driver moves his or her line of sight from the travelling direction of the vehicle to the equipment. Therefore, in order to guarantee safety while the vehicle is traveling, technology is used which makes it impossible to perform an input operation to the navigation system and the like, while the vehicle is traveling. However, if it is completely impossible to carry out an input operation to the car navigation system and the like, the driver cannot change the destination or route while traveling, and hence convenience is impaired.

Therefore, technology has been developed which allows a driver to carry out input operations to vehicle-mounted equipment during travel, while ensuring safety during travel. For instance, Japanese Unexamined Patent Application Publication No. H8-184449 discloses technology which disables operation of the display of a car navigation apparatus by the driver while the vehicle is traveling. Specifically, a detector which detects whether or not the vehicle is traveling and a detection sensor which detects an operation by the driver and an operation by a passenger, are provided. If the vehicle is not traveling, the operation of the display is enabled, whereas if the vehicle is traveling, the operation by the driver is disabled, and the operation by the passenger is enabled.

Enabling the operation by a person other than the driver even during travel as described above makes it possible to reduce inconvenience while ensuring safety. However, if there is no passenger, for example, then it remains impossible to perform an input operation to the car navigation system, or the like, while the vehicle is traveling. Furthermore, since it is necessary to determine whether the operator is the driver or a fellow passenger, then a complex mechanism is required. Moreover, if the detector identifies the operator incorrectly, then safety cannot be ensured.

SUMMARY OF THE INVENTION

The present invention has been designed in consideration of the circumstances described above, and an object of the present invention is to provide a vehicle control apparatus capable of achieving both safety and convenience of use of vehicle-mounted equipment.

An aspect of the vehicle control apparatus including: an equipment operation disabling module that disables an operation of equipment that is operated inside a vehicle equipped the vehicle control apparatus, when the vehicle is travelling at least at a prescribed speed; an outside information acquisition module that acquires information from outside the vehicle; a risk recognition module that calculates or determines a risk to the vehicle, on the basis of the outside information acquired by the outside information acquisition module; a driving operation assistance module that assists a driving operation of the vehicle, directly, by a notification, as represented by a warning, or both of these, on the basis of either one of a risk calculation result and a risk determination result for the vehicle delivered by the risk recognition module on the basis of the outside information; and an equipment operation enabling module that enables the operation of the equipment that has been disabled by the equipment operation disabling module, when the driving operation assistance module is assisting a driving operation of the vehicle.

DETAILED DESCRIPTION

Figure 1:
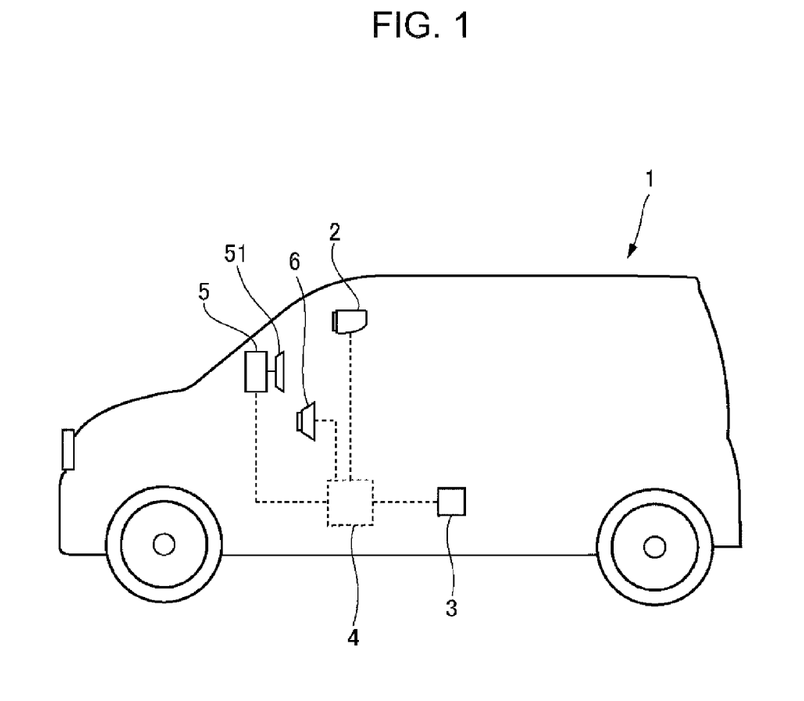
FIG. 1 is a general schematic drawing of a vehicle that is equipped with a vehicle control apparatus according to an implementation of the present invention.

Hereinafter, a preferred implementation of the present disclosure will be described in detail with reference to the accompanying drawings. FIG. 1 illustrates a vehicle 1 provided with a vehicle control apparatus according to the implementation. The vehicle 1 includes: an imaging device 2 that acquires information from outside the vehicle 1, a vehicle state detection device 3 that detects, for example, a travelling of the vehicle 1, a controller 4 that controls the vehicle 1 on the basis of a risk to the vehicle 1, a car navigation system 5 provided at the driver seat of the vehicle 1, and a warning device 6 that outputs a warning in the form of a display, sound, vibration, or the like, to the driver in the driver seat.

The imaging device 2, which serves as the outside information acquisition module of the present invention, includes two front cameras provided at the front of the vehicle 1, and acquires image data by capturing images of the outside of the vehicle 1 at prescribed time intervals (for example, every 4 milliseconds). In the present implementation, the imaging device 2 is disposed inside the vehicle near the front windscreen of the vehicle 1 and captures images in the forward direction of the vehicle 1, but the invention is not limited to this and a camera that captures images in a lateral direction or rearward direction of the vehicle 1 may be provided.

The vehicle state detection device 3 detects the travelling speed of the vehicle 1, the moment acting on the vehicle 1 and the steering angle of the vehicle 1, and acquires vehicle speed data corresponding to the detected travelling speed, moment data corresponding to the detected moment and steering angle data corresponding to the detected steering angle.

Figure 2:
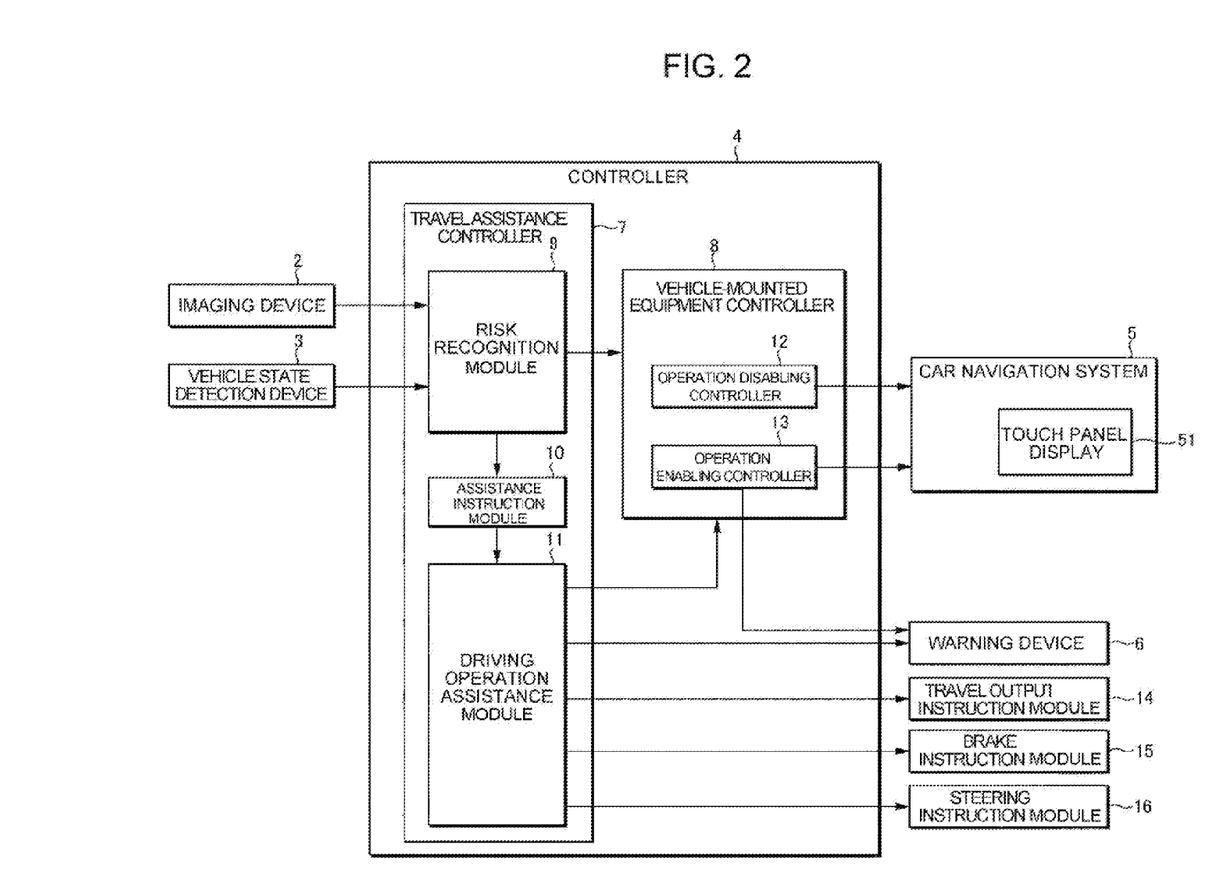
FIG. 2 is a block diagram illustrating input and output of control signals in the vehicle control apparatus.

The controller 4 is a CPU or ECU, for instance. As illustrated in FIG. 2, the controller 4 includes a travel assistance controller 7 that controls travel assistance to the vehicle 1 on the basis of information acquired by the imaging device 2 and the vehicle state detection device 3, and a vehicle-mounted equipment controller 8 which controls the vehicle-mounted equipment in the vehicle 1.

The travel assistance controller 7 is activated with the switching on of an ignition device of the engine of the vehicle 1 or a motor control starter acting as a power plant, for instance, an ignition switch (not illustrated), which is the switch of the starter device of an electric motor, or is activated at a time set on the basis of a signal from such activation, and performs travel assistance for the vehicle 1 at all times when the switch is in an activated state. The travel assistance controller 7 has a risk recognition module 9 that recognizes and determines the risk to the vehicle 1, an assistance instruction module 10 that instructs the performance of a driving operation of the vehicle 1 on the basis of the risk to the vehicle 1 determined by the risk recognition module 9, and a driving operation assistance module 11 that controls a warning and assistance relating to the driving operation of the vehicle 1 in accordance with the instruction from the assistance instruction module 10.

The risk recognition module 9 calculates and determines the risk to the vehicle 1 on the basis of outside information obtained by analyzing the image data acquired by the imaging device 2. In the present implementation, the risk recognition module 9 determines the presence or absence of objects, including preceding vehicles, pedestrian and obstacles, situated in the travelling direction of the vehicle 1, the distance from the vehicle 1 to the object, the travelling direction of the vehicle 1 with respect to the traffic lane, and the like, on the basis of the image data acquired by the imaging device 2. Furthermore, the risk recognition module 9 calculates and determines the risk to the vehicle 1, on the basis of the moment data and steering angle data acquired by the vehicle state detection device 3. In the present implementation, the risk recognition module 9 also determines a type of the moment, such as yaw, pitch or roll, acting on the vehicle 1, and the magnitude of the moment, on the basis of the moment data acquired by the vehicle state detection device 3, as well as determines the steering angle of the vehicle 1, on the basis of the steering angle data, the magnitude of the moment, or a combination of these. The risk recognition module 9 comprehensively analyzes and determines the risk to the vehicle 1, by using the various types of information determined on the basis of the image data, moment data and steering angle data.

For instance, the risk recognition module 9 calculates the relative position between the vehicle 1 and the object, such as a preceding vehicle, pedestrian and obstacle, on the basis of the image data, moment data, steering angle data, elapsed time, etc., or a combination of these, and determines whether or not the risk has increased. If it is estimated that there is no object in the travelling direction of the vehicle 1 or the distance from the vehicle 1 to the object is long, in the travelling direction of the vehicle 1 which is estimated from the moment data and the steering angle data, etc., then it is determined that the risk has not increased. On the other hand, if it is estimated that an obstacle is present in a near-distance range from the vehicle 1 in the travelling direction of the vehicle 1, or that the vehicle 1 is approaching the obstacle, then it is determined that the risk has increased.

Furthermore, the risk recognition module 9 predicts and determines whether or not the risk of the vehicle 1 will increase in the future (after a predetermined time elapses). More specifically, the risk recognition module 9 sets a prediction time on the basis of the image data, the moment data, the steering angle data, driver state data, such as the posture and driving time of the driver, and driving history data, such as operation amounts of the steering wheel, accelerator pedal and brake pedal, up to a prescribed time, for instance, up 10 seconds before. The risk recognition module 9 may set this prediction time by using all of the image data, moment data, steering angle data, driver state data, and driving history data, or may set the prediction time on the basis of any combination of these data. The risk recognition module 9 predicts and determines whether or not the determined risk increases before the set prediction time elapses from the current time.

The risk recognition module 9 may determine the risk to the vehicle 1 on the basis of only the image data acquired by the imaging device 2, or may determine the risk to the vehicle 1 on the basis of only the moment data and/or steering data acquired by the vehicle state detection device 3. Furthermore, the risk recognition module 9 may determine the risk to the vehicle 1 on the basis of the vehicle speed data acquired by the vehicle state detection device 3, in addition to the image data, moment data, and the like.

Furthermore, the risk recognition module 9 may determine the risk to the vehicle 1 on the basis of the integrated value of individual risk values. More specifically, the risk recognition module 9 may determine integrate a risk value derived from the image data, a risk value derived from the moment data, a risk value derived from the steering angle data, and the like, and use the integrated value of these risk values to determine the risk to the vehicle 1. For instance, if it is determined that there is no preceding vehicle, pedestrian or obstacle in the travelling direction of the vehicle 1, then the risk value becomes lower. If it is determined that a preceding vehicle is traveling in the travelling direction of the vehicle 1, then the risk value is higher as the distance from the vehicle 1 to the preceding vehicle is shorter. Moreover, the risk value is lower, as the moment acting on the vehicle 1 is weaker, and the risk value is lower as the steering angle is nearer to the straight travelling direction of the vehicle 1. Consequently, for example, even if the distance from the vehicle 1 to the preceding vehicle is not short, the integrated value of the individual risk values becomes high when the moment acting on the vehicle 1 is strong. The individual risk values may also be influenced by other risks such as a risk of injury to an occupant, based on the sitting position and attitude of the occupant.

Here, even when the individual risk values are calculated, the risk recognition module 9 may determine whether or not each of the individual risk values is equal to or less than a prescribed value, rather than determining the risk to the vehicle 1 on the basis of the integrated value of individual risks. Alternatively, the risk to the vehicle 1 may be determined by using the maximum value of the individual risk values, rather than the integrated value of the individual risks.

Furthermore, the risk recognition module 9 may set up a risk map indicating the distribution of the risk potential of the vehicle 1 on the basis of the image data acquired by the imaging device 2, and may calculate and determine the risk to the vehicle 1 on the basis of the set risk map. In this case, for example, multiple risk potential distributions based on the type of road and the type of obstacle, etc. situated about the periphery of the vehicle 1 are generated on the basis of image data, and a risk map is created by merging these risk potentials. In accordance with the created risk map, the risk is then determined on the basis of whether or not the distribution of risk potentials has increased relatively, and whether or not the vehicle 1 is close to the risk potential.

Furthermore, the risk recognition module 9 may obtain a risk distribution on the basis of a characteristic amount of the image data acquired by the imaging device 2, and determine the risk to the vehicle 1 on the basis of this risk distribution. Here, the risk determined from the characteristic amount of the image data is, for instance, higher when an object in the periphery of the vehicle 1 detected by the image data is a vehicle rather than road infrastructure, and is even higher when the object is a pedestrian, rather than a vehicle. A risk distribution representing the level of risk is represented by contour lines. The risk recognition module 9 refers to the risk distribution and determines the risk to the vehicle 1 on the basis of the state of the vehicle 1, and so on.

Moreover, the risk recognition module 9 may determine the risk to the vehicle 1 by estimating the inner state of the driver. In this case, for example, the risk recognition module 9 creates a model parameter by learning from the image data acquired by the imaging device 2 and the driving operation data for the driver. This model parameter is used to acquire a relationship between the risk level of the travel environment and an operation characteristic amount of the driver, and to estimate the current inner state of the driver. The estimated inner state of the driver and the travel environment risk are compared to determine the risk to the vehicle 1.

In this way, the risk recognition module 9 of the travel assistance controller 7 performs calculation on the recognized environment of the vehicle 1 to convert the risk into a parameter by calculation based, and assess the risk potential, and create a risk map, thereby determining the risk to the vehicle 1.

The assistance instruction module 10 determines whether or not to perform assistance of the driving operation by the driver on the basis of the risk to the vehicle 1 determined by the risk recognition module 9, and instructs the driving operation assistance module 11 to perform assistance of the driving operation. For example, the assistance instruction module 10 determines to perform assistance of the driving operation in the cases where the risk to the vehicle 1 as determined by the risk recognition module 9 is equal to or greater than a prescribed level, and where the risk to the vehicle 1 is tending to increase. In the present implementation, assistance of the driving operation is performed by the driving operation assistance module 11 only when it is determined to perform operation assistance by the assistance instruction module 10, but it is also possible to determine whether or not the driving operation assistance module 11 is to assist the driving operation, on the basis of the risk determined by the risk recognition module 9, without involving an instruction from the assistance instruction module 10, and it is also possible to make the driving operation assistance module 11 provide assistance of the driving operation at all times.

In accordance with an instruction from the assistance instruction module 10, the driving operation assistance unit 11 analyzes the various types of data input from the imaging device 2 and the vehicle state detection device 3, via the assistance instruction module 10, and controls the assistance of the driving operation of the vehicle 1 and warnings relating to the driving operation. In other words, the driving operation assistance module 11 adjusts the drive amount, braking amount, and steering amount of the vehicle 1, in accordance with the outside circumstances of the vehicle 1, and the travelling speed of the vehicle, and the like, and provides assistance to raise the safety of travel of the vehicle 1, and make the driving operation by the driver more comfortable. Furthermore, a warning for prompting the driver to decelerate the vehicle 1, or the like, is issued in accordance with the outside circumstances of the vehicle 1.

The assistance of the driving operation of the vehicle 1 which is performed by the driving operation assistance module 11 is controlled on the basis of the risk to the vehicle 1. In the present implementation, the driving operation assistance module 11 performs control to adjust the drive amount, braking amount and steering amount of the vehicle 1, so as to avoid or reduce the risk to the vehicle 1 determined by the risk recognition module 9.

The method of controlling assisting the driving operation is not limited to the method described above. For instance, the driving operation assistance module 11 may calculate collision conditions of the vehicle 1 with an obstacle, or the like, and moreover the driving operation assistance module 11 may adjust the drive amount and/or the braking amount, and the steering amount of the vehicle 1, in order to avoid a collision of the vehicle 1 with the obstacle, or the like, and to diminish collision damage. In this case, for example, the relative position of the vehicle 1 and the obstacle, or the like, is calculated on the basis of image data. The collision conditions with an obstacle, or the like, if the vehicle 1 travels at the current travelling speed and steering angle, are calculated, and the risks relating to the collision position, the physical constitution and posture of occupants and the like, are calculated and summed. If it is possible to avoid a collision, according to the calculated collision conditions, then a warning is issued by a notification module, for example, the warning device 6, to the user, and assistance in driving operation is also controlled in order to avoid a collision. The notification module may use a visual display or a mechanical movement, such as a vibration. Furthermore, if a collision of the vehicle 1 with an obstacle, or the like, is unavoidable, then travel assistance is controlled in order to minimize the summed risks to the occupants.

Furthermore, the driving operation assistance module 11 may set up a risk map indicating the distribution of the risk potential of the vehicle 1 on the basis of the image data acquired by the imaging device 2, and may set a target travel route for the vehicle 1 on the basis of the set risk map. In this case, for example, a plurality of risk potential distributions based on the type of road and the type of obstacle, etc. situated about the periphery of the vehicle 1 are generated on the basis of image data, and a risk map is created by synthesizing these risk potentials. A target travel route which avoids a region where a high risk potential is distributed is set on the basis of the created risk map, and assistance in driving operation is controlled rationally in accordance with the target travel route.

Furthermore, the driving operation assistance module 11 may control assistance in the driving operation based on the risk to the vehicle 1 determined by the risk recognition module 9 and by risk minimization trajectory planning. In this case, the risk recognition module 9 recognizes the risk to the vehicle 1 on the basis of the characteristic amount of the image data acquired by the imaging device 2. This risk is, for instance, higher when an object in the periphery of the vehicle 1 detected from the image data is a vehicle rather than road infrastructure, and is even higher when the object is a pedestrian, rather than a vehicle. The driving operation assistance module 11 represents the distribution circumstances of the recognized risk in the form of contours, and the trajectory that is to be traveled by the vehicle 1 is planned in such a manner that the vehicle 1 avoids places where the contours are high and travels in places where the risk is lowest. Control is then performed to adjust the drive amount, braking amount and steering amount of the vehicle 1, in such a manner that the position of the vehicle 1 coincides with the planned trajectory.

In this way, the driving operation assistance module 11 performs control to assist the driving operation by adjusting the drive amount and/or braking amount, steering amount, and the like, of the vehicle 1, and/or issuing warnings, in accordance with the outside circumstances of the vehicle 1 and the state of the vehicle 1.

In the present implementation, the risk recognition module 9, the assistance instruction module 10 and the driving operation assistance module 11 constitute the travel assistance controller 7 of the controller 4, but the invention is not limited to this and these modules may be provided as respectively separate control devices. In this case, the assistance instruction module 10 and the driving operation assistance module 11 input data directly from the imaging device 2 and the vehicle state detection device 3, and respectively determine the risk to the vehicle 1 and control the assistance of the driving operation.

The vehicle-mounted equipment controller 8 has an operation disabling controller 12 which performs control to disable the operation of the car navigation system. 5, and an operation enabling controller 13 which enables operation of the car navigation system 5 that has been disabled by the operation disabling controller 12.

The operation disabling controller 12, which is the equipment operation disabling module of the present invention, performs control to disable the operation of the car navigation system 5, when the speed of the vehicle 1 is equal to or greater than a prescribed value. In other words, when the vehicle 1 is travelling at or above a prescribed speed, for example 10 km/h, even when an operation of the car navigation system 5 is performed, the car navigation system 5 does not function in accordance with this operation. It is also possible to perform control such that actual operation of the car navigation system 5 is disabled while the vehicle is travelling.

When prescribed conditions are established, the operation enabling controller 13, which is the equipment operation enabling module of the present invention, performs control to enable operation of the car navigation system 5 that has been disabled by the operation disabling controller 12. In other words, even in cases where the vehicle 1 is travelling at or above the prescribed speed, the operation of the car navigation system 5 is enabled when prescribed conditions are established. The specific details are described hereinafter, but the operation enabling controller 13 performs control such that the driving operation assistance module 11 assists the driving operation of the vehicle 1, and when the risk to the vehicle 1 is in a prescribed range, performs control to enable operation of the car navigation system 5.

The vehicle-mounted equipment controller 8 and the driving operation assistance module 11 both perform control based on the risk to the vehicle 1 as determined by the risk recognition module 9, but the risk to the vehicle 1 which is used by the vehicle-mounted equipment controller 8 and the risk used by the driving operation assistance module 11 may be same or may be different. For example, the vehicle-mounted equipment controller 8 may perform control by predicting the risk that may occur during operation of vehicle-mounted equipment by an occupant, and the driving operation assistance module 11 may perform control by determining the actually occurring risk relating to the vehicle 1 which is to be avoided. To give a concrete example, when the distance between the vehicle 1 and the object is 100 m, then the operation enabling controller 13 of the vehicle-mounted equipment controller 8 may consider that the risk to the vehicle 1 is equal to or less than the prescribed level and perform control to enable operation of the vehicle-mounted equipment, whereas the driving operation assistance module 11 may consider that the risk is to be avoided and may perform control to adjust the drive amount or steering amount of the vehicle 1. Furthermore, when the vehicle 1 is reversing and there is no obstacle in the direction of rearward travel, then the operation disabling controller 12 of the vehicle-mounted equipment controller 8 may consider that the risk is equal to or greater than the prescribed level and perform control to disable operation of the vehicle-mounted equipment, whereas the assistance instruction module 10 may determine that there is no risk to be avoided and not issue an instruction to control assistance of the driving operation.

The car navigation system 5 is vehicle-mounted equipment which is located at the driver seat of the vehicle 1, and has a touch panel display 51. The touch panel display 51 has a function for displaying map information and the like, as well as a function for receiving operations performed by the driver. The driver is able to call up map information, recognize a route, and so on, by operating the touch panel display 51.

The warning device 6 is a speaker provided at the driver seat of the vehicle 1, which outputs a warning sound or voice announcement into the vehicle cabin. The warning device 6 may be combined with the car navigation system 5. More specifically, the car navigation system 5 may be configured so as to issue a warning noise or voice announcement, and a warning display. Furthermore, a notification sound which notifies pedestrians and the like, outside the vehicle of the approach of the vehicle 1 may also be output externally, rather than inside the vehicle cabin.

FIG. 2 is a block diagram illustrating the composition of one portion of the vehicle control apparatus of the vehicle 1. As illustrated in FIG. 2, the imaging device 2 and the vehicle state detection device 3 are connected to the input side of the risk recognition module 9 of the travel assistance controller 7. Therefore, the image data acquired by the imaging device 2, and the vehicle speed data, moment data and steering angle data, and the like, acquired by the vehicle state detection device 3 are input to the risk recognition module 9. On the other hand, the assistance instruction module 10 and the vehicle-mounted equipment controller 8 are connected to the output side of the risk recognition module 9 of the assistance instruction module 10. The driving operation assistance module 11 is connected to the output side of the assistance instruction module 10, and furthermore, the vehicle-mounted equipment controller 8, the warning device 6, a travel output instruction module 14 which performs control to adjust the drive amount for travel of the vehicle 1, a brake instruction module 15 which performs control to adjust the braking device of the vehicle 1, and a steering instruction module 16 which adjusts the steering amount of the steering wheel of the vehicle 1 are connected to the output side of the driving operation assistance module 11. Consequently, risk determination data and vehicle speed data, etc., from the risk recognition module 9 and assistance data from the driving operation assistance module 11 are input to the vehicle-mounted equipment controller 8. Furthermore, respective control signals are output from the driving operation assistance module 11 to each of the warning device 6, the travel output instruction module 14, the brake instruction module 15 and the steering instruction module 16.

The car navigation system 5 is connected respectively to the output sides of the operation disabling controller 12 and the operation enabling controller 13 of the vehicle-mounted equipment controller 8. Consequently, it is possible to output signals, such as a disabling signal or an enabling signal, to the car navigation system 5, from the vehicle-mounted equipment controller 8.

In the present implementation, the vehicle-mounted equipment controller 8 is capable of outputting signals to the car navigation system 5, but the invention is not limited to this, and the vehicle-mounted equipment controller 8 may be capable of outputting signals to other vehicle-mounted equipment, such as audio equipment or the air-conditioning module, for purposes other than a driving operation for travel of the vehicle. Furthermore, the image data acquired by the imaging device 2, the vehicle speed data acquired by the vehicle state detection device 3, and the like, may be output directly to the vehicle-mounted equipment controller 8 without passing via the risk recognition module 9.

The travel output instruction module 14 outputs a signal instructing acceleration or deceleration of the vehicle 1, to a drive control device (not illustrated) which controls the drive power source of the vehicle 1. The drive control device is capable of increasing or decreasing the drive amount of the vehicle 1, regardless of the operation of the accelerator, in accordance with an instruction from the travel output instruction module 14.

The brake instruction module 15 outputs a signal instructing operation of the brakes, to a brake control device (not illustrated) which performs control to operate the brake device of the vehicle 1, in accordance with a brake operation performed by the driver. The brake control device is capable of performing control to operate the brake device of the vehicle 1 and to adjust the magnitude of braking, regardless of whether or not there is a brake operation, in accordance with an instruction from the brake instruction module 15.

The steering instruction module 16 outputs a signal instructing a steering amount of a steering device, to a steering control device (not illustrated) which performs control to operate the steering device of the vehicle 1, in accordance with operation of the steering wheel performed by the driver. The steering control device is able to change the steering amount of the steering device of the vehicle 1, regardless of the operation of the steering wheel, in accordance with an instruction from the steering instruction module 16.

Figure 3:
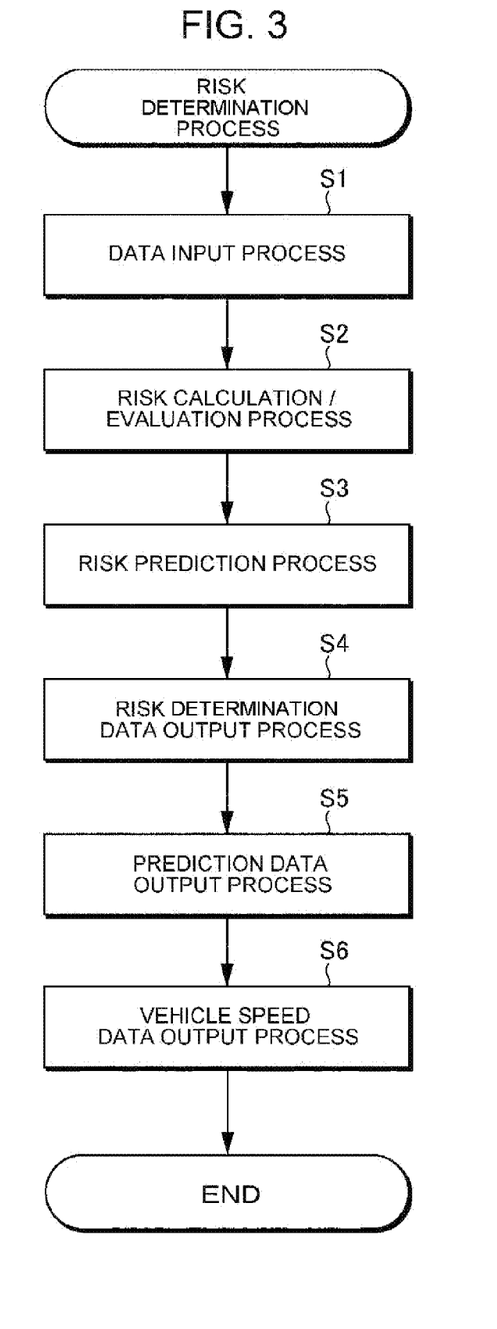
FIG. 3 is a diagram illustrating a risk determination process.

Next, a risk determination process for calculating and determining the risk to the vehicle 1 which is performed by the risk recognition module 9 will be described with reference to FIG. 3. The processing flow illustrated in FIG. 3 is executed at prescribed intervals apart (every 4 milliseconds, for example).

Firstly, in step S1, risk recognition module 9 inputs the image data acquired by the imaging device 2 and the vehicle speed data, moment data and steering angle data acquired by the vehicle state detection device 3.

In step S2, the risk recognition module 9 calculates and determines the risk to the vehicle 1 on the basis of the image data, vehicle speed data, moment data and steering angle data input in step S1. In this processing, as described above, the risk recognition module 9 determines the presence or absence of obstacles, or the like, situated in the travelling direction of the vehicle 1, calculates the relative positions of the vehicle 1 and objects such as a preceding vehicle, pedestrian, obstacle, and the like, on the basis of the distance from the vehicle 1 to the obstacle, the moment and steering angle of the vehicle 1, the elapsed time, etc., or a combination of these, and determines whether or not the risk is equal to or greater than a prescribed level and whether or not the risk has increased.

In step S3, the risk recognition module 9 predicts and determines whether or not the risk to the vehicle 1 determined in step S2 will increase after a prescribed time has elapsed. This prescribed time is determined by the risk recognition module 9 on the basis of any one of the image data, the vehicle speed data, the moment data, the steering angle data, the driver state data and the driving history data, or a combination of these data. The driver state data is data indicating the posture of the driver, the continuous driving time, and so on. Furthermore, the driving history data is data indicating the operation amount of the steering wheel, accelerator pedal and brake pedal, from a prescribed period beforehand until the current time. The prescribed time used by the risk recognition module 9 in risk prediction is not limited to this, and may be set to any time in advance, or may be determined on the basis of the characteristics of the vehicle 1 and driver, etc. In this case, the characteristics of the vehicle 1 are the model and weight of the vehicle 1, etc. and the characteristics of the driver and the age and physique of the driver, etc.

In step S4, the risk recognition module 9 sets the determination results in step S2 as the risk determination data, and outputs the risk determination data to the assistance instruction module 10.

In step S5, the risk recognition module 9 sets the prediction result in step S3 as prediction data, and outputs this prediction data to the vehicle-mounted equipment controller 8.

In step S6, the risk recognition module 9 outputs the vehicle speed data input in step S1, to the vehicle-mounted equipment controller 8. When the processing in this step is completed, the risk determination process terminates.

Figure 4:
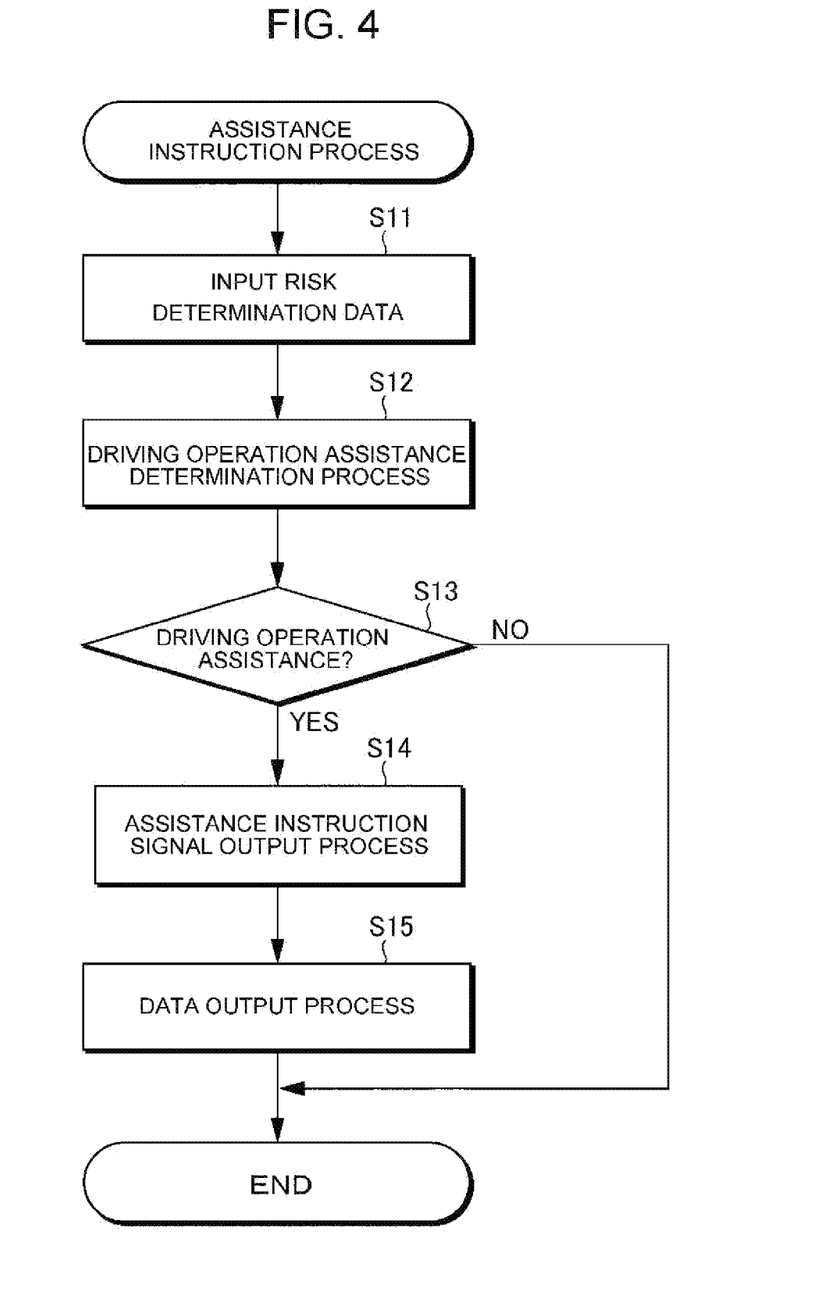
FIG. 4 is a diagram illustrating an assistance instruction process.

Next, the assistance instruction process performed by the assistance instruction module 10 to instruct implementation of assistance for a driving operation to the driving operation assistance module 11 will be described with reference to FIG. 4. The processing flow illustrated in FIG. 4 is executed at prescribed intervals apart (for example, every 4 milliseconds).

Firstly, in step S11, the assistance instruction module 10 inputs, from the risk recognition module 9, the risk determination data indicating the determination result of the risk to the vehicle 1 produced by the risk recognition module 9.

In step S12, the assistance instruction module 10 determines whether or not to perform assistance for the driving operation. More specifically, the assistance instruction module 10 analyzes the risk determination data input in step S11, and in cases where the risk to the vehicle 1 is equal to or greater than a prescribed level, or where the risk to the vehicle 1 has increased, it is determined to perform assistance for the driving operation. On the other hand, when the risk to the vehicle 1 is at or below the prescribed level and is not tending to increase, then it is determined not to perform assistance for the driving operation. The assistance instruction module 10 may input the prediction data, refer to the prediction result for the vehicle 1, and determine whether or not to assist the driving operation. Furthermore, even when the risk to the vehicle 1 is tending to increase, the assistance instruction module 10 may determine not to perform assistance for the driving operation, provided that the increase is small. In step S13, the assistance instruction module 10 transfers to step S14 when it is determined in step S12 to perform assistance for the driving operation, and terminates the assistance instruction process, when it is determined not to perform assistance for the driving operation.

In step S14, the assistance instruction module 10 outputs an assistance instruction signal for instructing the performance of assistance for the driving operation, to the driving operation assistance module 11.

In step S15, the assistance instruction module 10 outputs the risk determination data input from the risk recognition module 9, to the driving operation assistance module 11, whereupon the assistance instruction process is terminated.

Figure 5:
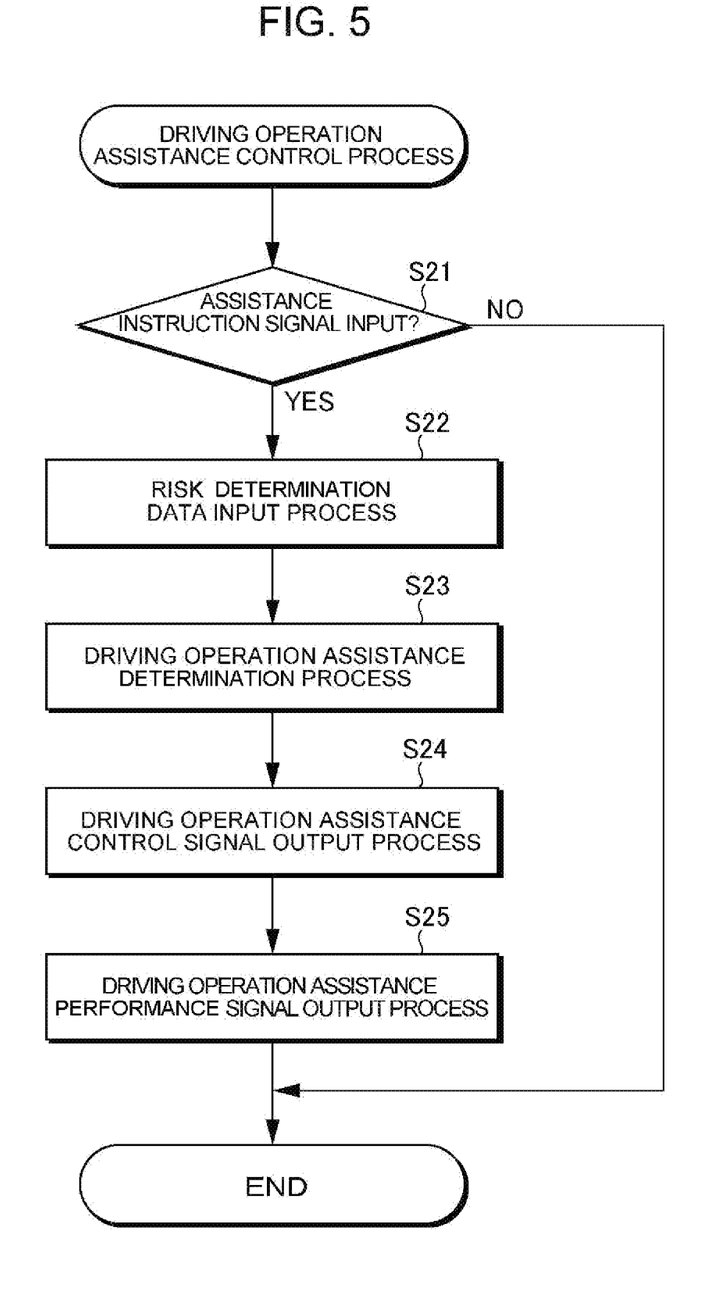
FIG. 5 is a diagram illustrating a driving operation assistance control process.

There follows with reference to FIG. 5 a description of the driving operation assistance control process for performing assistance for the driving operation of the vehicle 1 and issuing warnings, which is performed by the driving operation assistance module 11. The processing flow illustrated in FIG. 5 is executed at prescribed intervals apart (for example, every 4 milliseconds).

Firstly, in step S21, the driving operation assistance module 11 determines whether or not an assistance instruction signal has been input from the assistance instruction module 10. When an assistance instruction signal has been input, the driving operation assistance module 11 transfers processing to step S22, and in step S22, inputs risk determination data from the assistance instruction module 10. On the other hand, when no assistance instruction signal has been input, the driving operation assistance module 11 terminates the driving operation assistance control process.

In step S23, the driving operation assistance module 11 determines what kind of assistance for the driving operation to perform, on the basis of the risk determination data input in step S22. The driving operation assistance module 11 can ascertain the environment recognized on the basis of the outside circumstances of the vehicle 1, and the state of the vehicle 1, by analyzing the risk determination data. The driving operation assistance module 11 determines to perform assistance to reduce the vehicle speed by adjusting the drive amount of the vehicle 1, in cases where the vehicle speed is faster than a prescribed speed, for instance. Furthermore, when the moment acting on the vehicle 1 is larger or when it is forecast that the vehicle 1 will deviate from the lane in which it is travelling, then the driving operation assistance module 11 determines to perform assistance to change the steering amount of the steering device. Moreover, when there is a pedestrian in front of the vehicle 1, then the driving operation assistance module 11 determines to operate the brake device and also to provide assistance by warning the driver. In other words, the driving operation assistance module 11 determines to perform assistance to make the driving operation of the vehicle 1 more comfortable and safer, in accordance with the risk to the vehicle 1. The driving operation assistance module 11 may acquire the image data, moment data and steering angle data directly from the imaging device 2 or the vehicle state detection device 3, and determine what kind of assistance for the driving operation to perform.

In step S24, the driving operation assistance module 11 outputs control signals based on the driving operation assistance method determined in step S23, to the warning device 6, the travel output instruction module 14, the brake instruction module 15 and the steering instruction module 16. The warning device 6 which has received a control signal when a warning has been issued outputs a warning sound and voice announcement into the cabin. Furthermore, the travel output instruction module 14 outputs an instruction signal in accordance with the input control signal, to the drive control device. Moreover, the brake instruction module 15 outputs an instruction signal in accordance with the input control signal, to the brake control device. Furthermore, the steering instruction module 16 outputs an instruction signal in accordance with the input control signal, to the steering control device.

In step S25, the driving operation assistance module 11 outputs a driving operation assistance performance signal indicating that driving operation assistance has been performed, to the vehicle-mounted equipment controller 8. Consequently, the vehicle-mounted equipment controller 8 can ascertain that assistance of the driving operation of the vehicle 1 is being performed. When the process of the present step is completed, then the driving operation assistance control process terminates.

Figure 6:
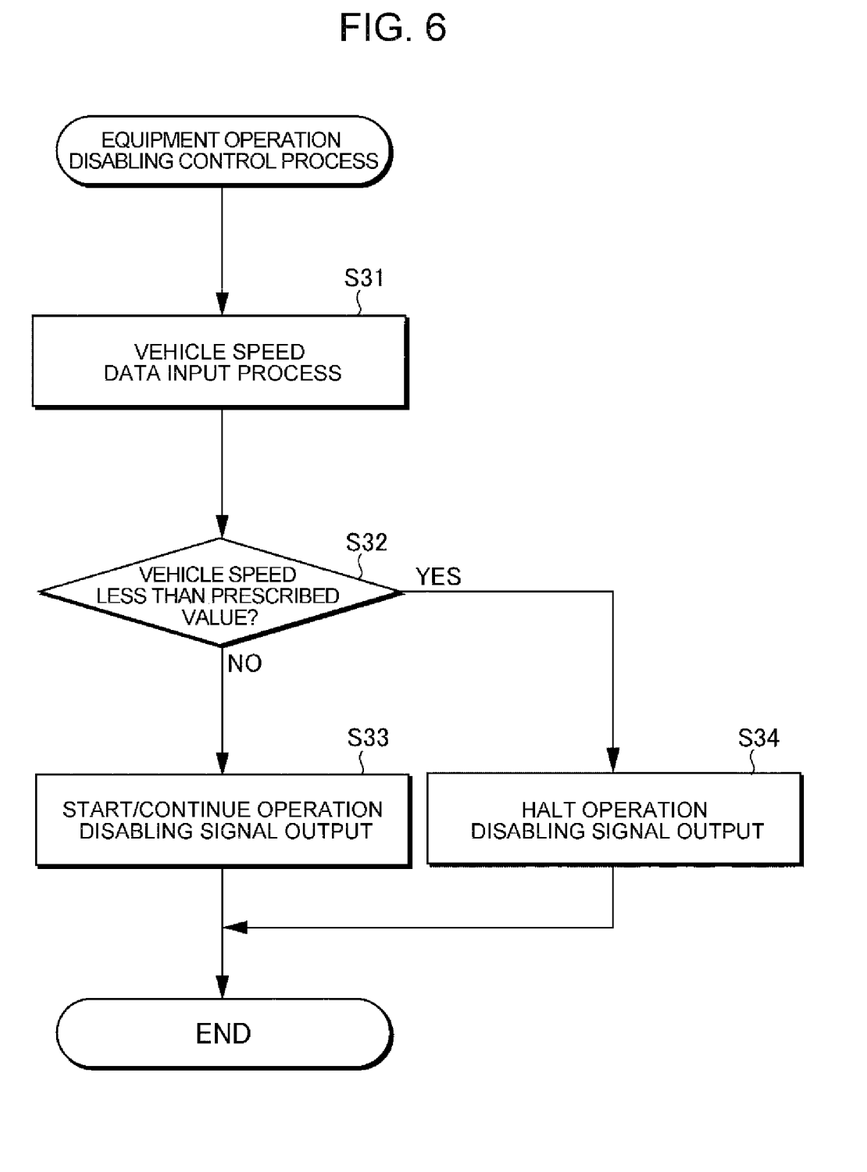
FIG. 6 is a diagram illustrating an equipment operation disabling control process.

Next, an equipment operation disabling control process for disabling operation of the vehicle-mounted equipment which is performed by the operation disabling controller 12 of the vehicle-mounted equipment controller 8 will be described with reference to FIG. 6. The processing flow illustrated in FIG. 6 is executed at prescribed intervals apart (for example, every four milliseconds).

Firstly, in step S31, the operation disabling controller 12 inputs vehicle speed data from the risk recognition module 9. The operation disabling controller 12 may input vehicle speed data directly from the vehicle state detection device 3.

In step S32, the operation disabling controller 12 determines whether or not the speed of the vehicle 1 is less than a prescribed value. More specifically, the operation disabling controller 12 analyzes the vehicle speed data input in step S31 and determines whether or not the vehicle 1 is stationary or is travelling at less than a prescribed speed, for example, 10 km/h. When the speed of the vehicle 1 is less than 10 km/h, then the procedure transfers to step S34, and when the vehicle speed is equal to or greater than 10 km/h, then the procedure transfers to step S33.

In step S33, the operation disabling controller 12 starts or continues the output of an operation disabling signal to the car navigation system 5. Consequently, the output of an operation disabling signal from the operation disabling controller 12 to the car navigation system 5 is started, and in cases where the operation disabling signal is already being output, the output of the operation disabling signal is continued. When the processing in this step has been completed, the equipment operation disabling control process terminates.

In step S34, the operation disabling controller 12 halts the output of the operation disabling signal to the car navigation system 5. Consequently, the operation disabling signal ceases to be output to the car navigation system 5 from the operation disabling controller 12. When the processing in this step has been completed, the equipment operation disabling control process terminates.

Figure 7:
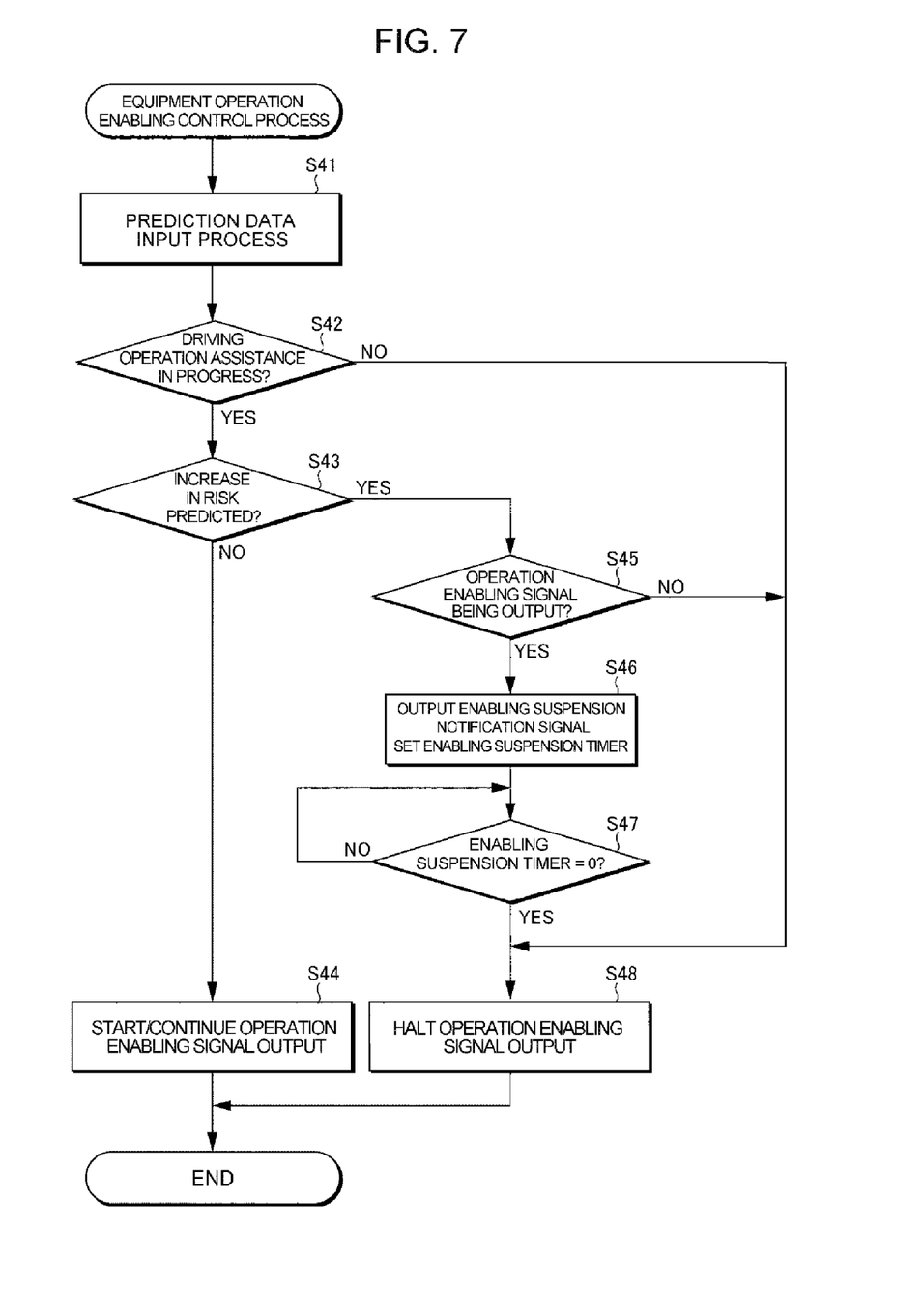
FIG. 7 is a diagram illustrating an equipment operation enabling control process.

Next, an equipment operation enabling control process performed by the operation enabling controller 13 of the vehicle-mounted equipment controller 8 for enabling operation of the vehicle-mounted equipment that has been disabled will be described with reference to FIG. 7. The processing flow illustrated in FIG. 7 is executed at prescribed intervals apart (for example, every four milliseconds).

Firstly, in step S41, the operation enabling controller 13 inputs the prediction data from the risk recognition module 9. Consequently, the operation enabling controller 13 acquires data of the result of predicting by the risk recognition module 9 whether or not the risk to the vehicle 1 increases before a prescribed time elapses in step S3.

In step S42, the operation enabling controller 13 determines whether or not the driving operation assistance module 11 is performing control to assist the driving operation of the vehicle 1. More specifically, the operation enabling controller 13 confirms whether or not the driving operation assistance implementation signal has been input from the driving operation assistance module 11, and when the operation driving assistance implementation signal is input, determines that the driving operation assistance module 11 is performing control to assist the driving operation of the vehicle 1. A case where the driving operation assistance module 11 is not performing control to assist the driving operation of the vehicle 1 means a case where the risk to the vehicle 1 is equal to or less than a prescribed level, or a case where the driving operation assistance module 11 is not operating due to a problem of some kind, or a case where the assistance of the driving operation by the driving operation assistance module 11 has been stopped by an operation performed by the driver. In cases where the driving operation assistance module 11 is performing control to assist the driving operation of the vehicle 1, the procedure transfers to step S43, and in cases where the driving operation assistance module 11 is not performing control to assist the travel of the vehicle 1, the procedure transfers to step S48.

In step S43, the operation enabling controller 13 analyzes the prediction data input in step S41. When the prediction result from the risk recognition module 9 indicates that the risk to the vehicle 1 increases before the prescribed time elapses, then the procedure transfers to step S45, and when the prediction result indicates that the risk to the vehicle 1 will not have increased when the prescribed time has elapsed, then the procedure transfers to step S44.

In step S44, the operation enabling controller 13 starts or continues the output of an operation enabling signal to the car navigation system 5. Consequently, the output of an operation enabling signal from the operation enabling controller 13 to the car navigation system. 5 is started, and in cases where the operation enabling signal is already being output, the output of the operation enabling signal is continued. When the processing in this step has been completed, the operation enabling control process terminates.

In step S45, the operation enabling controller 13 determines whether or not an operation enabling signal is currently being output to the car navigation system 5. In cases where the operation enabling signal is currently being output, the procedure transfers to step S46, and where the operation enabling signal is not currently being output, the procedure transfers to step S48.

In step S46, the operation enabling controller 13 outputs an enabling suspension notification signal to the warning device 6, as well as setting a value corresponding to a prescribed enabling suspension time (for example, 3 seconds), to an enabling suspension timer, which is a timer counter of the storage area of the RAM that is built into the operation enabling controller 13. The warning device 6 which has received the enabling suspension notification signal outputs a voice sound, stating, for example "vehicle-mounted equipment will cease to be operable in three seconds", so as to notify the occupants that operation of the vehicle-mounted equipment will be disabled when the prescribed time has elapsed. Furthermore, the enabling suspension timer carries out a subtraction process at prescribed cycles, until the set value becomes "0". The enabling suspension time set in the enabling suspension timer is desirably the same as the prescribed time which was used for risk prediction by the risk recognition module 9 in step S3, but is not limited to this and may be any time, and may be shorter than the prescribed time used for risk prediction.

In step S47, the operation enabling controller 13 determines whether or not the value of the enabling suspension timer set in step S46 is "0". A case where the value of the enabling suspension timer is "0" is a case where the enabling suspension time set in step S46 has elapsed. When the value of the enabling suspension timer is "0", the procedure transfers to step S48, and when the value of the enabling suspension timer is not "0", then the processing of this step is repeated until the value becomes "0".

In step S48, the operation enabling controller 13 stops the output of the operation disabling signal to the car navigation system 5. Consequently, the operation disabling signal ceases to be output from the operation enabling controller 13 to the car navigation system 5. When the processing in this step has been completed, the equipment operation enabling control process terminates. In the present implementation, even when assistance control of the driving operation of the vehicle 1 is being performed by the driving operation assistance module 11, control to stop the output of the operation enabling signal is performed in cases where the prediction result from the risk recognition module 9 indicates that the risk to the vehicle 1 increases before a prescribed time elapses (see step S43 above), but the invention is not limited to this. For example, the operation enabling controller 13 may input and analyze the risk determination data from the risk recognition module 9, and may stop the output of the operation enabling signal, when the risk determination result indicates that the risk has increased in comparison with the risk determination result input a prescribed time previously.

Figure 8:
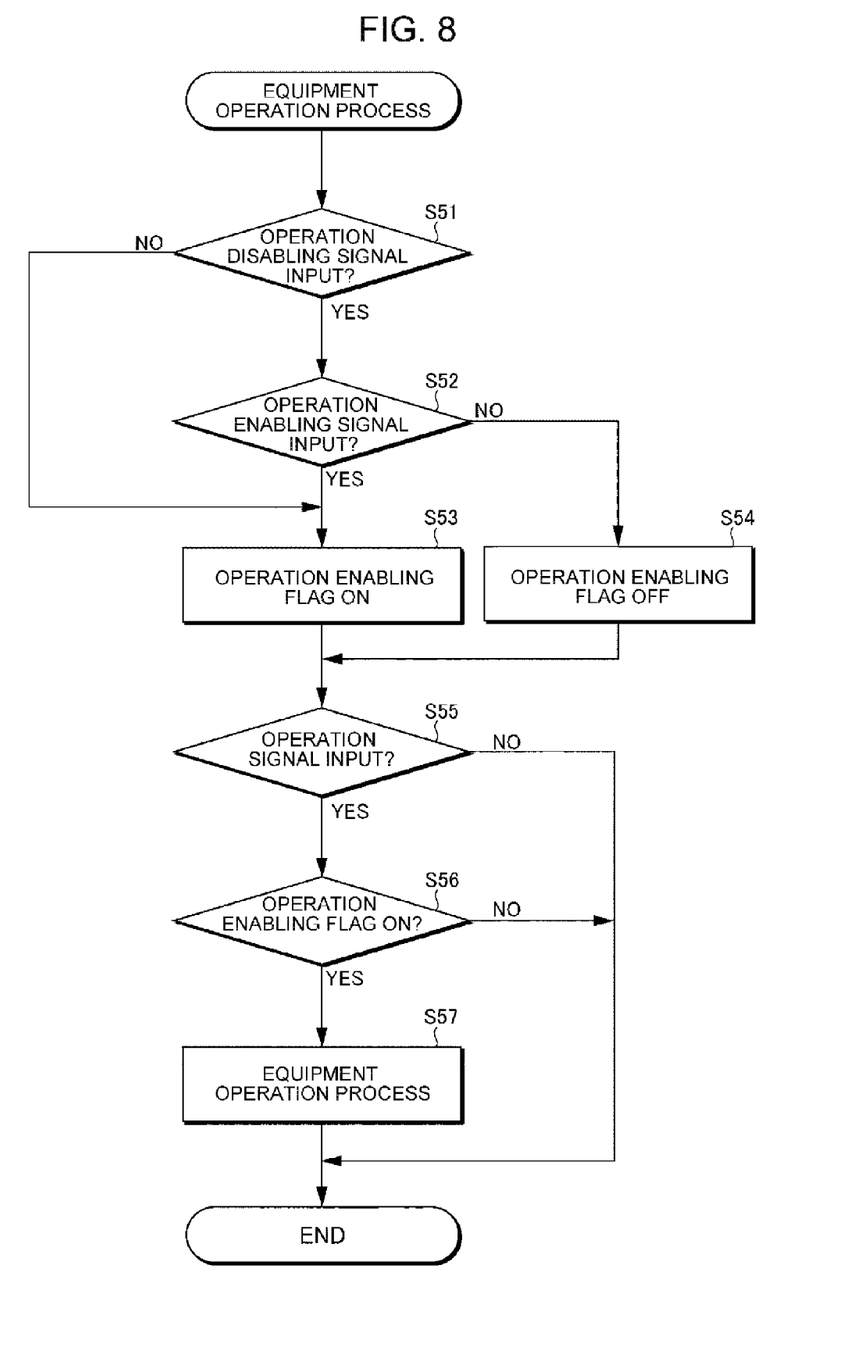
FIG. 8 is a diagram illustrating an equipment operation process.

Next, the equipment operation processing relating to the car navigation system 5 will be described with reference to FIG. 8. The processing flow illustrated in FIG. 8 is executed at prescribed intervals apart (every 4 milliseconds, for example).

Firstly, in step S51, the car navigation system 5 determines whether or not an operation disabling signal has been input from the operation disabling controller 12. In cases where the operation disabling signal has been input from the operation disabling controller 12, the procedure transfers to step S52, and in cases where the operation disabling signal has not been input, the procedure transfers to step S53.

In step S52, the car navigation system 5 determines whether or not an operation enabling signal has been input from the operation enabling controller 13. In cases where an operation enabling signal has been input, the procedure transfers to step S53, and in cases where an operation enabling signal has not been input, the procedure transfers to step S54.

In step S53, the car navigation system 5 switches on the operation enabling flag stored in the RAM built into in the car navigation system 5. When the processing in this step is completed, the procedure advances to step S55.

In step S54, the car navigation system 5 carries out processing to switch off an operation enabling flag which is stored in a RAM built into the car navigation system 5. When the processing in this step is completed, the procedure advances to step S55.

In step S55, the car navigation system 5 determines whether or not an operation signal indicating that the touch panel display 51 has been operated is input from the touch panel display 51. When a touch panel display 51 has been operated, the procedure transfers to step S56, and if the touch panel display 51 has not been operated, then the equipment operation process terminates.

In step S56, the car navigation system 5 determines whether or not the operation enabling flag which is stored in the RAM built into the car navigation system 5 has been switched on. If the operation enabling flag is on, then the procedure transfers to step S57, and if the operation enabling flag is off, then the equipment operation process terminates.

In step S57, the car navigation system 5 performs functions in accordance with the operations made on the touch panel display 51. In other words, the car navigation system 5 performs navigation functions, such as setting a destination, and audio functions, such as selecting music and the like, in accordance with the operations performed on the touch panel display 51. When the processing in this step has been completed, the equipment operation control process terminates.

In the present implementation, when the touch panel display 51 is operated, the car navigation system 5 determines whether or not the operation enabling flag is on, and performs functions in accordance with these operations when the flag is on. However the present invention is not limited to this. For example, the sensory response power source of the touch panel display 51 may be switched off so that operations to the touch panel display 51 cannot be accepted, when the operation enabling flag is off.

In this way, when the speed of the vehicle 1 is equal to or greater than a prescribed value of 10 km/h, then an operation disabling signal is output from the operation disabling controller 12 to the car navigation system 5, and control is performed to disable the operation of the car navigation system 5. However, even when the operation disabling signal is being output to the car navigation system 5, in cases where assistance control for the driving operation is being performed on the basis of the risk determination result, and where the prediction result for the risk to the vehicle 1 indicates that the risk to the vehicle 1 will not have increased when a prescribed time has elapsed, an operation enabling signal is output from the operation enabling controller 13 to the car navigation system 5. Therefore, it is possible to operate the car navigation system 5, even when the speed of the vehicle 1 is equal to or greater than the prescribed value.

On the other hand, in cases where assistance control for the driving operation of the vehicle 1 is not being performed, or where the risk prediction result for the vehicle 1 indicates that the risk to the vehicle 1 increases before the prescribed time elapses, the operation enabling signal is not output from the operation enabling controller 13 to the car navigation system 5. Consequently, when the speed of the vehicle 1 is equal to or greater than a prescribed value and assistance control for a driving operation is not being performed, then operation of the car navigation system 5 is not enabled. Furthermore, when the assistance control for a driving operation is stopped or it is predicted that the risk to the vehicle 1 will increase after enabling operation of the car navigation system 5, then the enabling of operation of the car navigation system 5 is suspended.

In the present implementation, when the speed of the vehicle 1 is equal to or greater than a prescribed value, the operation of the car navigation system 5 is enabled, when assistance control of the driving operation is being performed and it is predicted that the risk to the vehicle 1 will not have increased when a prescribed time has elapsed. However, the invention is not limited to this, and the operation of the car navigation system 5 may be enabled when the speed of the vehicle 1 is equal to or greater than a prescribed value, provided that assistance control for the driving operation is being performed. Furthermore, it is also possible to enable operation of the car navigation system 5, when the speed of the vehicle 1 is equal to or greater than a prescribed value, provided that it is predicted that the risk to the vehicle 1 will not have increased when the prescribed time has elapsed.

The car navigation system 5 may be controlled to display "Car navigation system currently operable" on the touch panel display 51, if the operation enabling flag is on. Furthermore, the car navigation system 5 may be controlled to display "Car navigation system currently inoperable" on the touch panel display 51, if the operation enabling flag is off. In this way, by notifying the driver whether or not the car navigation system 5 can be operated, it is possible to improve the convenience for the driver.

According to the vehicle control apparatus composed as described above, when the speed of the vehicle 1 is equal to or greater than a prescribed value, then an operation disabling signal is output from the operation disabling controller 12 to the car navigation system 5, and control is performed to disable the operation of the car navigation system 5. However, when assistance for the driving operation is being performed on the basis of the risk determination for the vehicle 1 by the driving operation assistance module 11, then an operation enabling signal is output from the operation enabling controller 13 to the car navigation system 5, and operation of the car navigation system 5 is enabled, even though an operation disabling signal has been output from the operation disabling controller 12. Consequently, it is possible to achieve both good safety and comfort during travel of the vehicle, as well as good operability of the equipment inside the vehicle.

Furthermore, the risk recognition module 9 predicts whether or not the determined risk to the vehicle 1 increases before a prescribed time elapses. The operation enabling controller 13 outputs an operation enabling signal to the car navigation system 5, when the prediction result indicates that the risk to the vehicle 1 will not have increased when the prescribed time has elapsed. Consequently, when assistance control for the driving operation is being performed and it is predicted that the risk to the vehicle 1 will not have risen when a prescribed time has elapsed, then the operation of the car navigation system 5 which has been disabled is enabled. In other words, even when assistance control for the driving operation is performed, the operation of the car navigation system 5 is not enabled in cases where the risk to the vehicle 1 will increase. Consequently, it is possible to further improve safety when the operation of vehicle-mounted equipment is enabled during travel of the vehicle.

Furthermore, when the operation enabling signal is being output to the car navigation system 5, the operation enabling controller 13 stops output of the operation enabling signal in cases where the risk prediction result for the vehicle 1 indicates that the risk increases before a prescribed time elapses, or where the risk to the vehicle 1 has increased in comparison with the risk determination result from a prescribed time beforehand. In other words, when the operation of the vehicle-mounted equipment has been enabled during travel of the vehicle, the enabling of operation of the vehicle-mounted equipment is suspended rapidly in accordance with change in the risk to the vehicle 1. Therefore, it is possible to further improve the safety of operation of the vehicle-mounted equipment during travel of the vehicle.

Furthermore, the operation enabling controller 13 outputs an enabling suspension notification signal to the warning device 6 and then stops the output of the operation enabling signal when the enabling suspension time has elapsed, in cases where the enabling of operation of the vehicle-mounted equipment is to be suspended on the basis of the prediction result from the risk recognition module 9. Consequently, occupants are notified in advance that the enabling of the operation of the vehicle-mounted equipment is to be suspended. Therefore, the occupants can take measures, such as rapidly completing the operation of the vehicle-mounted equipment, before the enabling of operation of the vehicle-mounted equipment is suspended, and hence any inconvenience resulting from the vehicle-mounted equipment suddenly becoming inoperable can be reduced.

Moreover, when predicting whether or not the risk to the vehicle 1 increases before a prescribed time elapses, the risk recognition module 9 sets the prescribed time on the basis of the outside information of the vehicle 1 as acquired from the image data, information regarding the state of the vehicle 1 as acquired from the vehicle speed data, moment data, and steering angle data, and information regarding the state of the driver as acquired from the driver state data. Furthermore, the risk recognition module 9 can determine the prescribed time to be used for predicting the risk of the vehicle 1 by also referring to the driving history data, or may set the prescribed time in advance or determine the prescribed time on the basis of characteristics relating to the vehicle 1 and the driver, etc. Consequently, it is possible to achieve more accurate prediction of the risk to the vehicle 1.

In the present implementation, the operation disabling controller 12 and the operation enabling controller 13 of the vehicle-mounted equipment controller 8 perform control for disabling or enabling the operation of the car navigation system 5, but the invention is not limited to this. Apart from the car navigation system 5, a plurality of other equipment (not illustrated) for purposes other than a driving operation for travel of the vehicle, such as an audio device, air-conditioning module, etc. is provided at the driver seat, and the operation of the equipment during travel of the vehicle 1 may also be subjected to similar control to the car navigation system 5, by the vehicle-mounted equipment controller 8. Furthermore, in addition to the equipment mounted in the vehicle 1, the operation of portable telephones, portable televisions and the like, taken into the vehicle by the driver, for example, can also be controlled by the vehicle-mounted equipment controller 8.

Moreover, in the present implementation, the risk recognition module 9 recognizes the environment of the vehicle 1 by determining the outside circumstances of the vehicle 1, on the basis of the image data from outside the vehicle 1 captured by the imaging device 2. However, the invention is not limited to this; for example, the risk recognition module 9 may determine the outside circumstances of the vehicle 1 on the basis of data on the outside circumstances of the vehicle 1 acquired by another device, such as a radar using electromagnetic waves or a sonar using ultrasonic waves.

The invention claimed is:

1. A vehicle control apparatus, comprising:
    equipment that is operated from inside a vehicle equipped with the vehicle control apparatus; and
    a controller configured to:
        disable operation of the equipment that is operated from inside the vehicle equipped with the vehicle control apparatus, when the vehicle is travelling at least at a prescribed speed;
        acquire information from outside the vehicle;
        calculate or determine a risk to the vehicle, based on the outside information acquired by the controller;
        assist a driving operation of the vehicle, directly, by a notification, as represented by a warning, or both of these, based on either one of a risk calculation result and a risk determination result based on the outside information;
        enable operation by a vehicle driver of the equipment that is operated from inside the vehicle equipped with the vehicle control apparatus, which has been disabled, in response to the controller assisting a driving operation of the vehicle;
        predict whether the calculated or determined risk to the vehicle based on the outside information increases before a prescribed time elapses; and
        enable the operation of the equipment that has been disabled when the controller is assisting a driving operation of the vehicle based on the outside information and when the controller has not predicted that the risk to the vehicle increases before the prescribed time elapses.

2. The vehicle control apparatus according to claim 1, wherein controller ceases to enable operation of the equipment, if any one of the following occurs while the operation of the equipment is enabled: the risk calculated or determined has increased, or a prediction is made by the controller that the risk increases before the prescribed time elapses.

3. The vehicle control apparatus according to claim 2, wherein the controller is further configured to notify the driver, in advance, of the suspension of the enabling of the operation of the equipment, when the controller is to suspend the enabling of the operation of the equipment based on either one of the determination of an increase in the risk to the vehicle and the prediction of an increase in the risk to the vehicle.

4. The vehicle control apparatus according to claim 1, wherein the controller predicts whether the calculated or determined risk to the vehicle based on the outside information increases before the elapse of a time that is determined based on any one of information relating to a state of the vehicle, information relating to a state of the driver, and a combination of these items of information, in addition to the outside information acquired by the controller.

5. The vehicle control apparatus according to claim 2, wherein controller predicts whether the calculated or determined risk to the vehicle based on the outside information increases before the elapse of a time that is determined based on any one of information relating to a state of the vehicle, information relating to a state of the driver, and a combination of these items of information, in addition to the outside information acquired by the controller.

6. The vehicle control apparatus according to claim 1, wherein the controller predicts whether the calculated or determined risk to the vehicle based on the outside information increases before the elapse of a time that is determined based on any one of information relating to a state of the vehicle, information relating to a state of the driver, and a combination of these items of information, and a combination of information pieces relating to a driving history up to a set time, in addition to the outside information acquired by the controller.

7. The vehicle control apparatus according to claim 2, wherein the controller predicts whether the calculated or determined risk to the vehicle based on the outside information increases before the elapse of a time that is determined based on any one of information relating to a state of the vehicle, information relating to a state of the driver, and a combination of these items of information, and a combination of information pieces relating to a driving history up to a set time, in addition to the outside information acquired by the controller.

8. The vehicle control apparatus according to claim 1, wherein the controller predicts whether the calculated or determined risk to the vehicle based on the outside information increases before the elapse of a time that is determined based on characteristics of one of the vehicle and driver, or before the elapse of a predetermined time.

9. The vehicle control apparatus according to claim 2, wherein the controller predicts whether the calculated or determined risk to the vehicle based on the outside information increases before the elapse of a time that is determined based on characteristics of one of the vehicle and driver, or before the elapse of a predetermined time.

* * * * *